United States Patent [19]

Morita et al.

[11] 3,849,731

[45] Nov. 19, 1974

[54] CHANNEL SELECTING CONTROL SYSTEM FOR TELEVISION TUNER

[75] Inventors: Koji Morita, Tokyo; Tadashi Sato, Yono, both of Japan

[73] Assignee: Sony Corporation, Tokyo, Japan

[22] Filed: May 7, 1973

[21] Appl. No.: 358,142

[30] Foreign Application Priority Data

May 8, 1972 Japan .............................. 47-45216

[52] U.S. Cl. ................. 325/464, 325/393, 325/332, 307/223, 178/DIG. 15

[51] Int. Cl. ............................................ H04n 5/49

[58] Field of Search .......... 178/DIG. 15; 325/464, 325/468–471, 390, 392, 393, 395, 396, 325/332–336; 334/15; 307/223 R, 320

[56] References Cited

UNITED STATES PATENTS

| | | | |
|---|---|---|---|
| 3,654,557 | 4/1972 | Sakamoto et al. | 325/468 X |
| 3,714,585 | 1/1973 | Koch | 325/464 X |
| 3,746,886 | 7/1973 | Konopka | 302/223 |
| 3,750,032 | 7/1973 | Andrews | 325/470 |

*Primary Examiner*—Robert L. Griffin
*Assistant Examiner*—Aristotelis M. Psitos
*Attorney, Agent, or Firm*—Lewis H. Eslinger, Esq.; Alvin Sinderbrand, Esq.

[57] ABSTRACT

The electromechanical channel selector of a remotely controlled television tuner is driven step by step through predetermined positions at selected channels under the control of a pulse signal whose frequency is increased at unused channels so as to cause the channel selector to step through unused channels at a faster rate.

11 Claims, 6 Drawing Figures

CHANNEL SELECTING CONTROL SYSTEM FOR TELEVISION TUNER

BACKGROUND OF THE INVENTION

The invention relates to electromechanical control systems for television tuners generally and more particularly to such channel selecting control systems which are remotely controlled.

In a remote control channel selector for a television tuner a push button switch is typically provided for automatically selecting the television channel. In some types of channel control systems control signals are successively transmitted to select one channel after another at a predetermined rate and to stop at a desired channel. In these systems when the tuner selects a particular channel, a time interval is required during which the channel selector remains at each position for a predetermined interval of time. This time interval is required so that the user of the remote control system can determine whether the contents of the picture on that channel are distinguishable and in fact whether a broadcast signal is even present at that channel. The time interval must also be sufficiently long to allow for accurate selection of the designated channel.

The time interval required to undertake this operation requires about 0.5 seconds at a minium. If 0.5 seconds are required for each of the twelve standard broadcast channels (plus an extra stop at the UHF channel band) it may take as long as 6 seconds for a continuous cycle of a turret-type VHF tuner. When it is considered that of the thirteen channels there may be several at which no television signal is supplied, this time is annoying to the observer and wasteful.

SUMMARY OF THE INVENTION

The present invention overcomes the problem of wasted time in selecting channels by a channel selecting control system for a television tuner comprising channel selecting means, means for driving the channel selecting means to sequentially select each television channel of a television tuner, means for producing a control signal, pulse generating means for producing a train of pulse signals at one of two predetermined frequencies in response to the control signal and for supplying the pulse train signal to the channel driving means to drive the channel selecting means in step by step fashion at timed intervals corresponding to the frequency of the pulse trains, frequency control means connected to the pulse generating means, and unused channel detecting means connected to the frequency control means for detecting unused channels selected by the channel selecting means and for actuating the frequency control means so as to increase the frequency of the pulse train signal and thereby cause the channel selecting means to step through unused channels at a faster rate than through the used channels.

In one preferred embodiment of the invention the control signal producing means comprises a receiver for receiving a remote control signal, a bistable logic circuit supplied with a set signal from the receiver circuit, and means for producing a reset signal in response to the output of the unused channel detecting means and for supplying the reset signal to the bistable logic means, the bistable logic means being controlled by the set and reset signals to produce the control signal. The pulse generating means is comprised of an astable multivibrator. The frequency control means comprises a semiconductor switch connected in parallel with one of the time constant determining portions of the multivibrator so that when the transistor is made conductive by the unused channel detector means it reduces the time constant portion of the multivibrator circuit to increase the frequency of the multivibrator circuit and thereby increase the frequency of the pulse train signal.

Accordingly it is one object of the invention to provide an improved system for controlling the channel selection in a television tuner so that desired channels are rapidly selected in response to a remote control signal.

It is another object of the invention to provide a channel selecting control system for a television tuner in which each desired channel is sequentially selected in response to a control signal and unused broadcast channels are substantially skipped automatically.

The foregoing and other objectives, features, and advantages of the invention will be more readily understood upon consideration of the following detailed description of certain preferred embodiments of the invention, taken in conjunction with the accompanying drawings.

Figure 1:
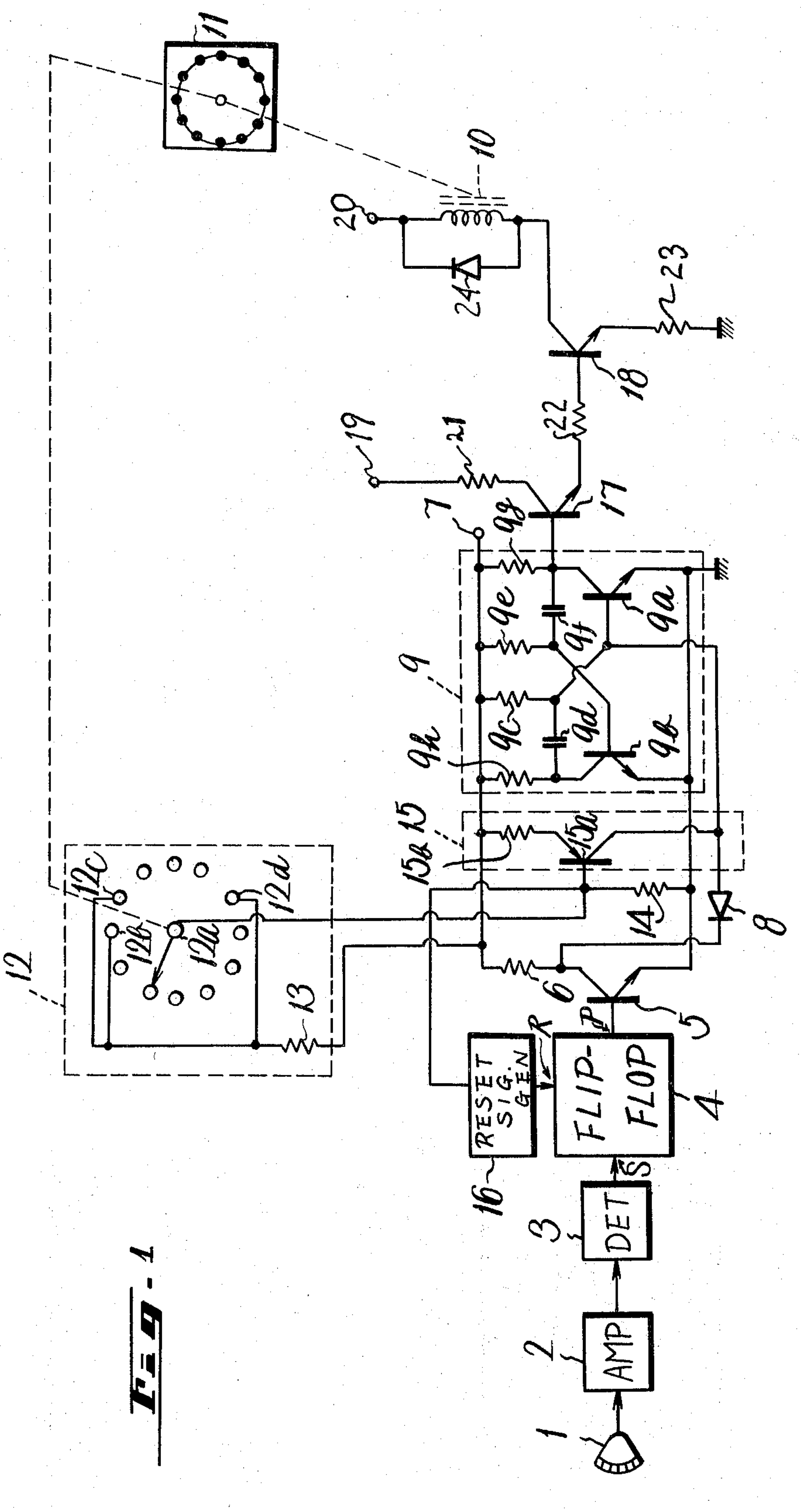
FIG. 1 is a schematic circuit diagram of one embodiment of a channel control system according to the invention.
Figure 2A:
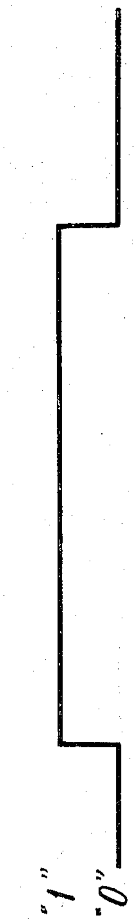
Figure 2B:
Figure 2C:
Figure 2D:
Figure 2E:
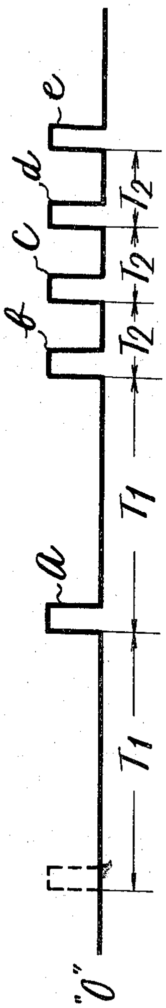

FIG. **2*a* is a waveform diagram of the output of the detector 3 in the embodiment of FIG. 1**;

FIG. **2*b* is a waveform diagram of the output of the flip-flop circuit 4 in the embodiment of FIG. 1**;

FIG. **2*c* is a waveform diagram of the output of the transistor 5 in the embodiment of FIG. 1**;

FIG. **2*d* is a waveform diagram of the output of the transistor 15*a* of the embodiment of FIG. 1; and FIG. 2*e* is a waveform diagram of the output of transistor 17 in the embodiment of FIG. 1**.

DESCRIPTION OF CERTAIN PREFERRED EMBODIMENTS

Referring now more particularly to FIG. 1 a remote control system for a television tuner according to one embodiment of the invention is illustrated. Reference numeral 1 designates a microphone for receiving a supersonic signal from a remote control, hand-held unit (not shown) which may be of a frequency of, for example, 40 KHz. The output signal from the microphone 1 is applied through an amplifier 2 to a detector circuit 3 which produces an output signal in response to the supersonic control signal. The output from the detector circuit 3 is applied to a set terminal S of a bistable logic circuit, for example a flip-flop 4. The flip-flop circuit 4 takes the set state preferentially. When a set signal is applied to the S terminal the potential at the output terminal P of the flip-flop 4 is made substantially zero and will remain at that potential until the reset pulse is supplied to an input terminal R of the flip-flop 4. The base electrode of an NPN transistor 5 is connected to the output terminal P of the flip-flop 4. The collector electrode of the transistor 5 is connected through a resistor 6 to a power supply terminal 7 which is connected to an external power supply (not shown). The emitter electrode of the transistor 5 is connected to the circuit ground. In effect, the transistor 5 forms a gate circuit. When a reset pulse is supplied to the input terminal R of the flip-flop 4 the potential at the output terminal P rises to a predetermined positive level to make the transistor 5 conductive.

The collector of the transistor 5 is also connected to the cathode of a semiconductor diode 8 whose anode is connected to the oscillation control terminal of a pulse generator 9, for example, an astable multivibrator which is designed to normally produce a pulse signal every 0.5 seconds.

More specifically, the anode of the diode 8 is connected to the base electrode of an NPN-type transistor 9*a* and to the power supply terminal 7 through a resistor 9*c*. The base electrode of the transistor 9*a* is also connected to the collector electrode of an NPN transistor 9*b* through a capacitor 9*d*. Together the resistor 9*c* and the capacitor 9*d* form a first time constant circuit. The collector electrode of the transistor 9*b* is connected to the power supply terminal 7 through a resistor 9*h*. The emitter electrodes of the transistors 9*a* and 9*b* are both connected to the circuit ground. The base electrode of the transistor 9*b* is connected to the power supply terminal 7 through a resistor 9*e* and to the collector electrode of the transistor 9*a* through a capacitor 9*f*. Together the resistor 9*e* and the capacitor 9*f* constitute a second time constant circuit. The collector electrode of the transistor 9*e* is connected to the power supply terminal 7 through a resistor 9*g* and is also connected to the base electrode of an NPN transistor 17.

As will be explained in greater detail hereinafter when the transistor 5 is nonconductive the astable multivibrator 9 oscillates at a frequency rate of one pulse every 0.5 seconds. When the transistor 5 is made conductive the diode 8 also becomes conductive and the base of the transistor 9*a* is at a potential only slightly greater than the ground circuit which thereby stops the oscillation of the multivibrator 9.

The multivibrator 9 controls a driving device 10 in the form of a plunger through a transistor 17 whose collector electrode is connected through a biasing resistor 21 to a voltage source 19 and whose emitter electrode is connected through a resistor 22 to the base electrode of an NPN transistor 18. The transistor 18 has its emitter electrode connected through a resistor 23 to the circuit ground and its collector electrode connected through the plunger 10 to a voltage source 20. A diode is connected in parallel with the plunger coil 10 to shunt back EMF voltages generated in the plunger coil.

Each time the plunger 10 is energized the channel selector 11, which is of the turret type, is stepped by one predetermined interval corresponding to one channel of the television receiver. Since the plunger is energized with each pulse from the multivibrator 9 the channel selector 11 may be stepped at a rate of once every 0.5 seconds.

There is also provided a channel skipping device 12 which detects unused channels. A movable contact arm 12*a* of the channel skipping device 12 is arranged to be rotated in correspondence with the channel selector 11. A plurality of fixed contacts 12*b*, 12*c* and 12*d* are provided at rotational positions corresponding to positions of the channel selector 11 at which actual television broadcasts are received. In the embodiment depicted in FIG. 1 the actual channels are represented as the first, second and sixth channels so that when the channel selector 11 is rotated to the first, second or sixth channels the movable contact arm 12*a* is connected to the fixed contacts 12*b*, 12*c* and 12*d*, respectively. When the channel selector 11 is turned to any of the remaining, unused channels the movable contact 12a is in an electrically open state.

The fixed contacts 12*b*, 12*c* and 12*d* are connected together and are further connected through a resistor 13 to the power source terminal 7. The movable contact arm 12*a* is connected directly to the base of a PNP type transistor 15*a* and to the circuit ground through a resistor 14. The emitter electrode of the transistor 15*a* is connected through a resistor 15*b* to the power source terminal 7. The collector electrode of the transistor 15*a* is connected to the base electrode of the transistor 9*a*. Thus the emitter-collector junction of the transistor 15*a* is connected in parallel with the resistor 9*c*.

As will be readily understood by those skilled in the art when the transistor 15*a* is made conductive the resistor 15*b* is connected in parallel with the resistor 9*c* to thereby shorten the time constant of the multivibrator 9 and increase its running frequency. The resistive value of the resistor 15*b* may be selected such that when connected in parallel in this manner to the resistor 9*c* the multivibrator oscillates at a rate of one pulse every 0.1 second.

The transistor 15*a* is biased in such a manner that when the contact 12*a* is connected to one of the fixed contacts the transistor 15 is nonconductive and the multivibrator 9 oscillates at its normal rate of one pulse every 0.5 second. When the contact 12*a* is electrically open the transistor 15*a* is biased through the resistor 14 to become conductive and the multivibrator oscillates at a rate of one pulse every 0.1 second.

Each time the moving contact 12*a* connects with one of the fixed contacts 12*b*, 12*c* or 12*d* a positive signal is also supplied to the reset signal generator 16 which causes a reset signal to be supplied to the terminal R of the flip-flop 4.

In operation, when it is desired that the channel selector of the tuner 11 be turned to the sixth channel, for example, from a position such as the first channel a supersonic control signal is supplied to the microphone 1 so that an output signal 1 as shown in FIG. 2a is maintained at the output of the detector circuit 3 for a predetermined time interval sufficient for the tuner 11 to be rotated through the first and second channels on which television broadcast are present, that is for a time interval of at least one second.

The output signal from the detector circuit 3 is applied to the input of the flip-flop 4 which produces an output signal 0 as shown in FIG. 2*b*. This makes the transistor 5 nonconductive and hence the signal at its collector is made 1 as shown in FIG. 2*c* to cause the astable multivibrator 9 to be operative. At this point the movable contact 12*a* of the channel skipping device 12 is initially connected to the first contact 12*b* so that the potential at the movable contact 12*a* is at a predetermined positive level as shown in FIG. 2*d*. This causes the transistor 15*a* to be nonconductive with the result that the astable multivibrator 9 generates one pulse at every normal time interval $T_1$, for example, 0.5 second.

Thus a first pulse signal *a* such as is shown in FIG. 2*e*, is produced at the output of the multivibrator 9 to energize the plunger 10 and thereby step the tuner 11 through one predetermined interval so that the contact arm 12a is caused to engage with the sixth contact 12c. At this point a reset signal is supplied through the contact arm 12a to the reset signal generator 16 and the flip-flop 4 is reset, but since the supersonic signal continues to be supplied to the microphone 1 the process is repeated and the selector 11 is stepped to an unused channel in response to a second pulse *b*.

When the moving contact arm 12a is rotated to one of the unused positions the transistor 15a becomes conductive, as explained above, and the time constant circuit of the multivibrator 9 is lowered so that its oscillation is shortened to a time $T_2$, for example, 0.1 second. The multivibrator 9 then produces third, fourth and fifth pulses *c*, *d* and *e*, respectively, at 0.1 second intervals. This causes the plunger 10 to step the channel selector 11 through the fourth and fifth channels to the sixth channel, respectively.

When the channel selector 11 is turned to the sixth channel the movable contact 12a is connected to the fixed contact 12d so that the movable contact 12a is again at a predetermined positive potential. This positive potential makes the transistor 15a nonconductive and resets the flip-flop 4. Since the ultrasonic signal has terminated, the positive signal supplied to the base electrode of the transistor 5 cause it to become conductive and the multivibrator ceases its oscillation. Therefore the channel selector 11 remains at the sixth channel.

Thus according to the present invention the unused channels are rapidly skipped over automatically and the channel selector is reliably stopped at the desired channel.

The elements of the invention described above, as for example the detector 3 and the flip-flop 4, have not been described in detail since their individual circuit constructions are well known to those skilled in the art.

Furthermore, in the above-described embodiment the unused channel detecting means is described as being of a mechanical switch type it will be appreciated by those skilled in the art that in other embodiments the unused channel detector means is electronic and is responsive to received carrier signals from the composite television signal. Thus at the unused channels where no carrier signal is received an appropriate control signal is supplied to the transistor 15a to make it conductive.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

We claim as our invention:

1. A channel selecting control system for a television tuner comprising:

a. a turret-type channel selector which is rotatable through a plurality of positions corresponding to respective television channels, b. driving means for rotating said turret-type channel selector to sequentially select said television channels, c. means for producing a control signal, d. pulse generating means for producing a pulse signal of a predetermined frequency in response to the control signal and for supplying the pulse signal to the driving means to rotate said channel selector in step by step fashion at timed intervals corresponding to the frequency of the pulse signal at said positions corresponding to television channels, e. frequency control means connected to the pulse generating means, and f. unused channel detecting means connected to the frequency control means for detecting at least one unused channel selected by said turret-type channel selector and for actuating said frequency control means so as to increase the frequency of the pulse signal, to thereby cause the turret-type channel selector to substantially skip the position corresponding to the unused channel.

2. A channel selecting control system for the channel selector of a television tuner comprising:

a. driving means for driving the channel selector to sequentially select each television channel, b. control signal producing means comprising means for receiving a remotely transmitted signal, a first flip-flop, means responsive to the receiving means for supplying the flip-flop with a set signal produced in response to the remotely transmitted signal, and means for producing a reset signal and for supplying the reset signal to the flip-flop, the flip-flop being controlled by the set and reset signals to produce a control signal, c. pulse generating means for producing a pulse signal of a predetermined frequency in response to the control signal and for supplying the pulse signal to the driving means to drive the channel selector in step by step fashion at timed intervals corresponding to the frequency of the pulse signal at the positions of selected channels, d. frequency control means connected to the pulse generating means, and e. unused channel detecting means for detecting at least one unused channel selected by the channel selecting means and for actuating the reset signal producing means and the frequency control means so as to increase the frequency of the pulse signal, to thereby cause the channel selector to substantially skip the unused channel.

3. A channel selecting control system for a television tuner as recited in claim 2, wherein the pulse generating means comprises astable means including a time constant circuit for determining the frequency of the pulse signal, the time constant circuit being connected to the frequency control means.

4. A channel selecting control system for a television tuner as recited in claim 3, wherein the frequency control means comprises an impedance element and a transistor with an emitter and collector current path connected in parallel with a part of the time constant circuit through the impedance element and a base connected to the unused channel detecting means, the conductive condition of the transistor being controlled by the output of the unused channel detecting means.

5. A channel selecting control system for a television tuner as recited in claim 4, wherein the unused channel detecting means comprises a plurality of fixed contacts each corresponding to the respective channels and a movable contact being selectively connected to each one of the fixed contacts and deriving therefrom an output which is indicative of the used or unused nature of the channel selected by the channel selector of the tuner.

6. A channel selecting control system for a television tuner as recited in claim 5, wherein the movable contact is moved in response to the operation of the channel selector.

7. A channel selecting control system for a television tuner as recited in claim 6 wherein the channel selector comprises a rotatable turret and the driving means includes a plunger controlled by the control signal from the astable means to move the rotatable turret.

8. A channel selecting control system for a television tuner as recited in claim 1, in which said unused channel detecting means includes a rotary switch which is rotated with said turret-type channel selector by said driving means.

9. A channel selecting control system for a television tuner as recited in claim 1, in which said pulse generating means includes a pair of transistors and a time constant circuit having its time constant controlled by said frequency control means for determining the periods in which said transistors are alternatively and reciprocally in the conductive states thereof.

10. A channel selecting control system for a television tuner as recited in claim 9, in which said frequency control means includes a transistor connected with said time constant circuit and being controllable by said unused channel detecting means.

11. A channel selecting control system for a television tuner as recited in claim 1, in which said means for producing a control signal includes means for detecting a manually controlled signal, and a flip-flop circuit selectively controlled by said unused channel detecting means and by said means for detecting a manually controlled signal.

* * * * *